US008745135B2

(12) United States Patent
Chen et al.

(10) Patent No.: US 8,745,135 B2
(45) Date of Patent: Jun. 3, 2014

(54) SYSTEM AND METHOD FOR ATTRIBUTE DETECTION IN USER PROFILE CREATION AND UPDATE

(75) Inventors: Weidong Chen, Palo Alto, CA (US); Lei Zhu, San Jose, CA (US); Min Zhu, Los Altos Hills, CA (US)

(73) Assignee: Cisco Technology, Inc., San Jose, CA (US)

(*) Notice: Subject to any disclaimer, the term of this patent is extended or adjusted under 35 U.S.C. 154(b) by 162 days.

(21) Appl. No.: 13/223,072

(22) Filed: Aug. 31, 2011

(65) Prior Publication Data

US 2011/0314105 A1    Dec. 22, 2011

Related U.S. Application Data

(63) Continuation of application No. 11/172,089, filed on Jun. 29, 2005, now Pat. No. 8,046,410.

(51) Int. Cl.
| | | |
|---|---|---|
| G06F 15/16 | (2006.01) | |
| G06F 17/20 | (2006.01) | |
| G06N 5/02 | (2006.01) | |
| G06Q 50/00 | (2012.01) | |
| G06F 17/28 | (2006.01) | |
| G06Q 10/06 | (2012.01) | |
| G10L 15/26 | (2006.01) | |

(52) U.S. Cl.
CPC .................. *G06N 5/02* (2013.01); *G06Q 50/01* (2013.01); *G06F 17/28* (2013.01); *G06Q 10/063112* (2013.01); *G10L 15/26* (2013.01)
USPC .......................................... 709/204; 707/603

(58) Field of Classification Search
CPC ........... G06Q 10/063112; G06Q 50/01; G06F 17/28; G06N 5/02; G10L 15/26
USPC ............................................ 709/204; 707/603
See application file for complete search history.

(56) References Cited

U.S. PATENT DOCUMENTS

| | | | |
|---|---|---|---|
| 6,115,709 | A | 9/2000 | Gilmour et al. |
| 6,205,472 | B1 | 3/2001 | Gilmour |
| 6,397,212 | B1 | 5/2002 | Biffar |
| 6,438,580 | B1 | 8/2002 | Mears et al. |
| 6,647,383 | B1 | 11/2003 | August et al. |
| 6,654,735 | B1 | 11/2003 | Eichstaedt et al. |
| 6,668,251 | B1 | 12/2003 | Goldberg |
| 6,832,224 | B2 | 12/2004 | Gilmour |

(Continued)

OTHER PUBLICATIONS

"Notification of Transmittal of the International Search Report and the Written Opinion of the International Searching Authority, or the Declaration," International Filing Date: Dec. 29, 2006, International Application No. PCT/US2006/062745, Date of Mailing: Jul. 17, 200S, pp. 1-15.

*Primary Examiner* — Michael Chao

(57) ABSTRACT

In one embodiment, a scheduled collaboration session in a social network is detected, the scheduled collaboration session to occur at a time in the future and at that time provide real-time communication among participants. A plurality of participants expected to attend the scheduled collaboration session are detected. A subject matter of the scheduled collaboration session is detected. One or more key words are derived from the detected subject matter of the scheduled collaboration session. Profiles maintained in the social network for the plurality of participants expected to attend the scheduled collaboration session are updated based on the one or more key words, the updating to include refining an area of expertise indicated in the profiles.

20 Claims, 12 Drawing Sheets

(56) References Cited

U.S. PATENT DOCUMENTS

| | | |
|---|---|---|
| 7,043,698 B2 | 5/2006 | Newbold |
| 7,200,638 B2 | 4/2007 | Lake |
| 7,249,034 B2 | 7/2007 | Schirmer et al. |
| 2002/0062368 A1 | 5/2002 | Holtzman et al. |
| 2002/0078050 A1* | 6/2002 | Gilmour ............................ 707/9 |
| 2002/0078150 A1 | 6/2002 | Thompson et al. |
| 2002/0188681 A1 | 12/2002 | Gruen et al. |
| 2003/0028595 A1 | 2/2003 | Vogt et al. |
| 2003/0135379 A1 | 7/2003 | Schirmer et al. |
| 2003/0154212 A1* | 8/2003 | Schirmer et al. .......... 707/103 R |
| 2003/0158867 A1* | 8/2003 | Goodwin et al. ............. 707/200 |
| 2003/0216981 A1 | 11/2003 | Close et al. |
| 2004/0064431 A1 | 4/2004 | Dorner et al. |
| 2004/0205672 A1 | 10/2004 | Bates et al. |
| 2005/0071506 A1 | 3/2005 | Hettish |
| 2005/0222890 A1* | 10/2005 | Cheng et al. ....................... 705/9 |
| 2006/0064431 A1* | 3/2006 | Kishore et al. ................ 707/102 |
| 2013/0346079 A1* | 12/2013 | Miglietta et al. .............. 704/235 |

\* cited by examiner

SYSTEM AND METHOD FOR ATTRIBUTE DETECTION IN USER PROFILE CREATION AND UPDATE

RELATED APPLICATIONS

The present application is a continuation of U.S. Pat. Ser. No. 11/172,089 filed on Jun. 29, 2005 by Weidong Chen et al., the contents of which are incorporated by reference herein in their entirety.

FIELD OF INVENTION

The present invention relates generally to social network systems and, more particularly, to dynamic social network systems.

BACKGROUND

There has been an increased use in collaboration sessions that are Internet or web-based to communicate with employees, vendors, and clients. During these collaboration sessions, information is typically exchanged between multiple participants. This exchanged information may include audio, graphical, and/or textual information.

There has also been an increased use of social networks such as Friendster, LinkedIn, and Spooke to facilitate connections between the respective community members.

SUMMARY

In one embodiment, the methods and apparatuses detect a user participating in a collaboration session; create a profile associated with the user; and detect an attribute associated with the profile based on the collaboration session.

BRIEF DESCRIPTION OF THE DRAWINGS

The accompanying drawings, which are incorporated in and constitute a part of this specification, illustrate and explain one embodiment of the methods and apparatuses for extending a dynamic social network system. In the drawings.

DETAILED DESCRIPTION

The following detailed description of the methods and apparatuses for extending a dynamic social network system refers to the accompanying drawings. The detailed description is not intended to limit the methods and apparatuses for extending a dynamic social network system. Instead, the scope of the methods and apparatuses for extending a dynamic social network system is defined by the appended claims and equivalents. Those skilled in the art will recognize that many other implementations are possible, consistent with the present invention.

References to a device include a device utilized by a user such as a desktop computer, a portable computer, a personal digital assistant, a video phone, a landline telephone, a cellular telephone, and a device capable of receiving/transmitting an electronic signal.

References to a collaboration session include a plurality of devices that are configured to view content submitted by one of the devices. For example, the collaboration session may include a data conference or a video conference through a network, a phone line, and/or the Internet. Further, the communications between participants may be through text messaging, audio conferencing, video conferencing, email, short messaging service, and the like.

References to a participant include a user of a device that participates or is scheduled to participate in the collaboration session.

References to a presenter include a participant that shares content shared with other participants.

References to an attendee include a participant that receives content shared by another participant. The attendees are capable of viewing content that is offered by the presenter. In some instances, the attendee is capable of modifying the content shared by the presenter.

In one embodiment, the methods and apparatuses for extending a dynamic social network system creates profiles associated with each user that participates within a collaboration session, updates the profiles based on the collaboration sessions, searches for profiles based on subject matter of the collaboration session, and/or tracks the hierarchy of a profile relative to other profiles.

Figure 1:
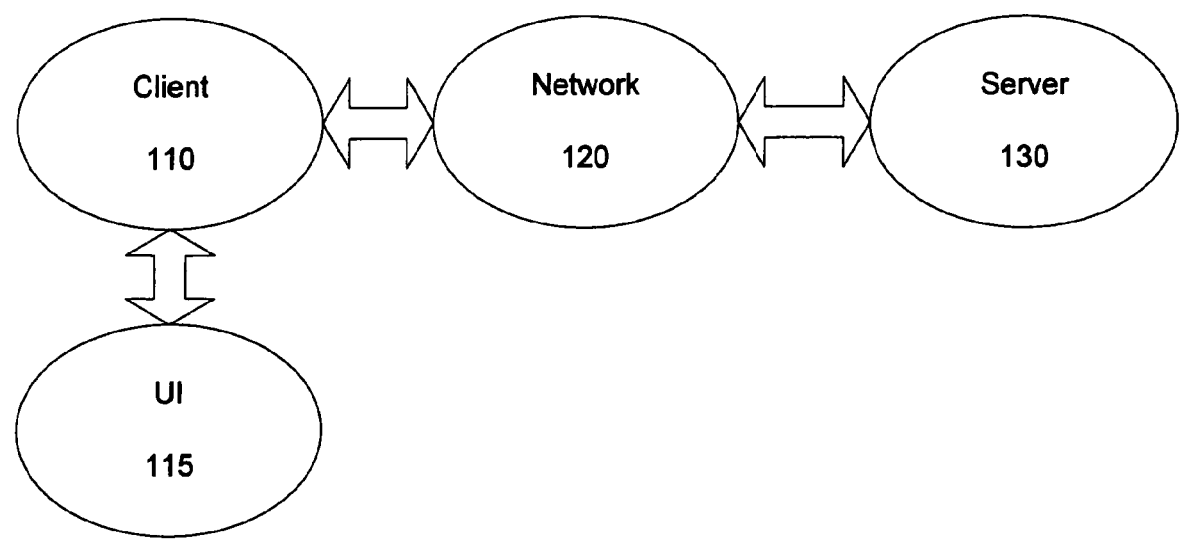
FIG. 1 is a diagram illustrating an environment within which the methods and apparatuses for extending a dynamic social network system are implemented.

FIG. 1 is a diagram illustrating an environment within which the methods and apparatuses for extending a dynamic social network system are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments extending a dynamic social network system below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
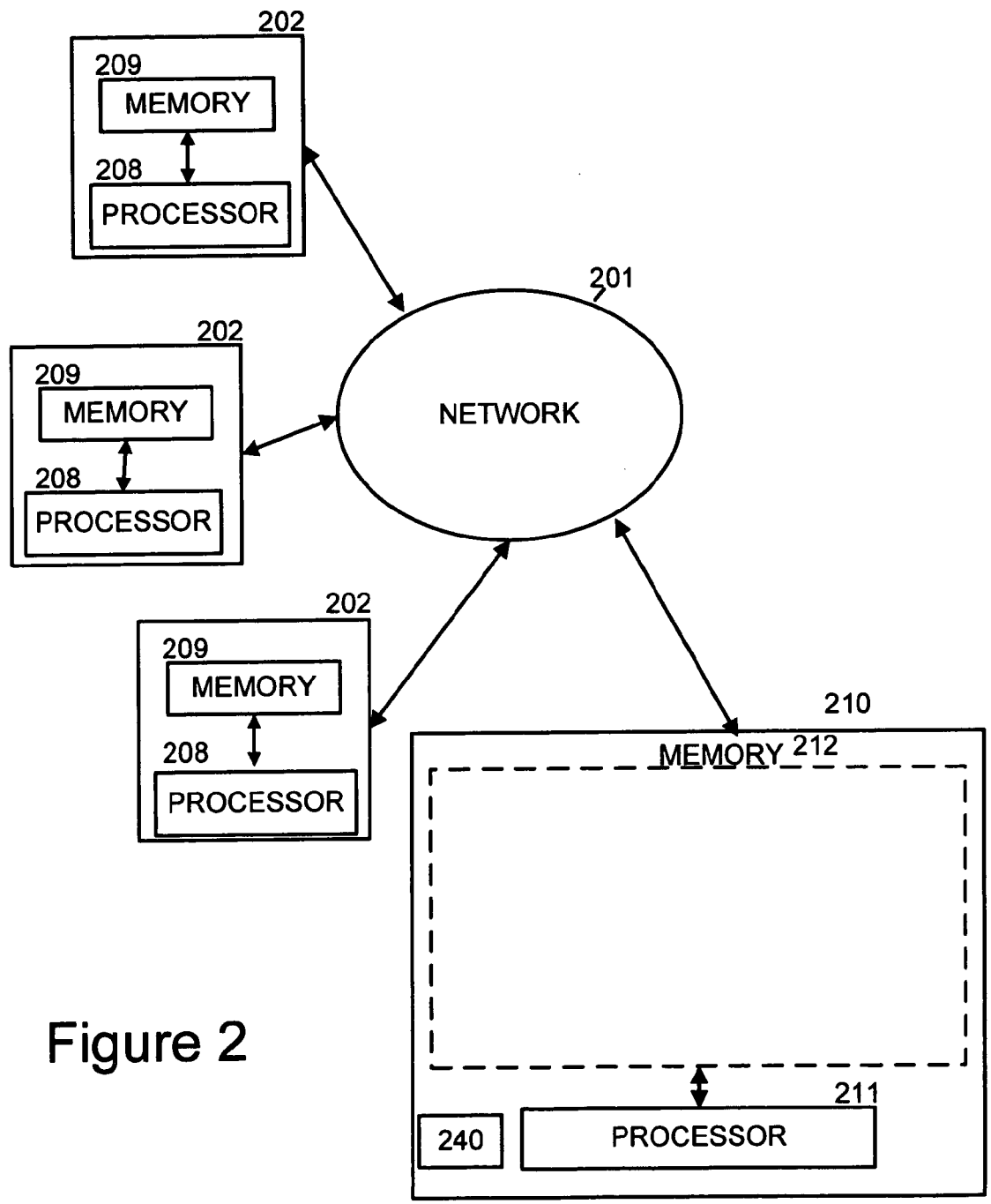
FIG. 2 is a simplified block diagram illustrating one embodiment in which the methods and apparatuses for extending a dynamic social network system are implemented.

FIG. 2 is a simplified diagram illustrating an exemplary architecture in which the methods and apparatuses for extending a dynamic social network system are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for extending a dynamic social network system. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on extending a dynamic social network system as determined using embodiments described below.

In one embodiment, the dynamic social network system utilizes the collaboration sessions to share information and communicate among the participants. For example, collaboration sessions are configured to provide real-time communication between multiple participants, In one embodiment, the content that is shared among the participants of the collaboration session is content that is displayed on the desktop of one of the participants.

Figure 3:
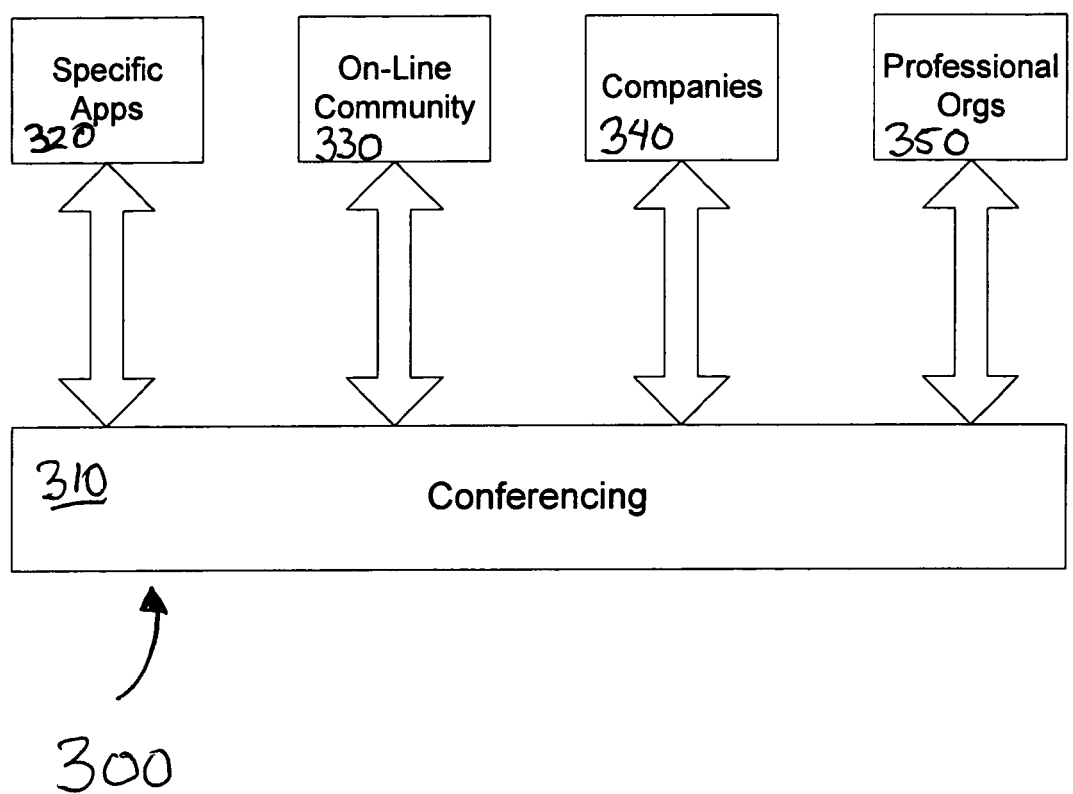
FIG. 3 is a simplified block diagram illustrating a system, consistent with one embodiment of the methods and apparatuses for extending a dynamic social network system.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a conferencing module 310, an applications grouping 320, an on-line community grouping 330, a company grouping 340, and a professional organization grouping 350.

In one embodiment, the conferencing module 310 communicates with the applications grouping 320, the on-line community grouping 330, the company grouping 340, and the professional organization grouping 350. In one embodiment, the conferencing module 310 coordinates tasks, requests, and communications between and within the applications grouping 320, the on-line community grouping 330, the company grouping 340, and the professional organization grouping 350.

In one embodiment, the conferencing module 310 allows the different groupings to communicate and hold collaboration sessions between users within each grouping and across multiple groupings.

In one embodiment, the conferencing module 310 detects content that is utilized by one of the users within one of the groupings. In one embodiment, the content is utilized in connection with multiple devices within a collaboration session between multiple parties. For example, the collaboration session may include a data conference or a video conference through a network, a phone line, and/or the Internet.

In one embodiment, the content is a document utilized within a collaboration session. In another embodiment, the content is audio visual media that is utilized within a collaboration session.

In one embodiment, the conferencing module 310 monitors input from various interface devices connected to devices that are participating in the collaboration session. These various interface devices include a keyboard, a pointing device, a microphone, a telephone, a video camera, and the like.

In one embodiment, the applications grouping 320 includes users that are related to a particular application. For example, multiple users that are interested in a particular application can form a user's group that is represented by the applications grouping 320.

In one embodiment, the on-line community grouping 330 includes users that are related to a particular community group such as Friendster or another social networking group.

In one embodiment, the company grouping 340 includes users that are related to a particular company. For example, multiple users that are employees at a particular company are related to each other and are represented by the company grouping 340.

In one embodiment, the professional organization grouping 350 includes users that are related to a particular professional organization. For example, multiple users that are members of a particular professional organization are related to each other and are represented by the professional organization grouping 350.

The system 300 in FIG. 3 is shown for exemplary purposes and is merely one embodiment of the methods and apparatuses for extending a dynamic social network system. Additional modules may be added to the system 300 without departing from the scope of the methods and apparatuses for extending a dynamic social network system. Similarly, modules may be combined or deleted without departing from the scope of the methods and apparatuses for extending a dynamic social network system.

Figure 4:
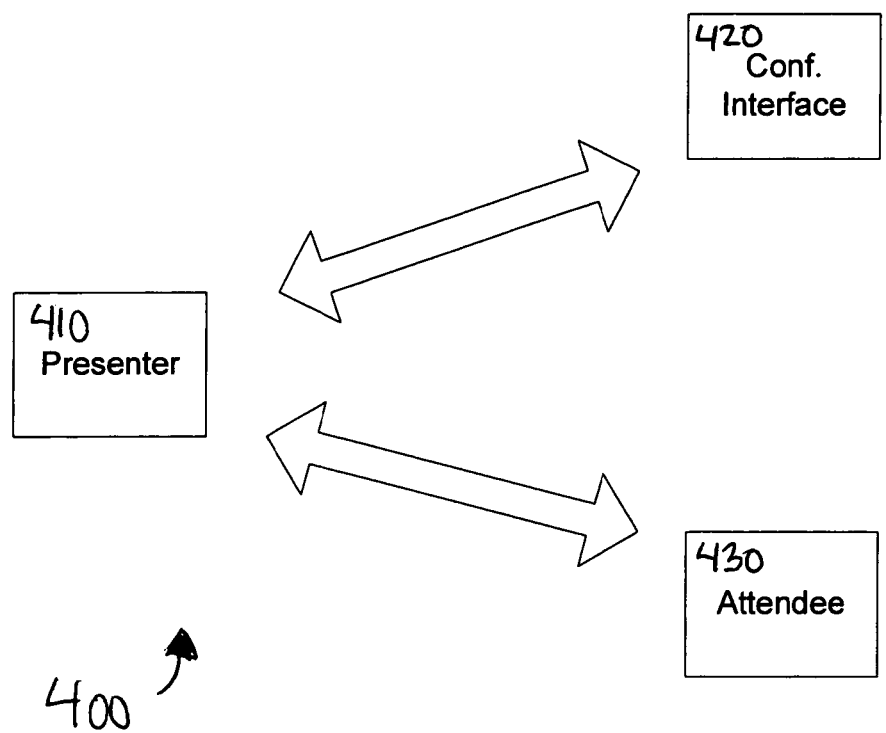
FIG. 4 is a simplified block diagram illustrating a system, consistent with one embodiment of the methods and apparatuses for extending a dynamic social network system.

FIG. 4 illustrates one embodiment of a system 400. In one embodiment, the system 400 facilitates a collaboration session between multiple parties. In one embodiment, the system 400 includes a presenter device 410, a conference interface 420, and an attendee device 430. In one embodiment, the presenter device 410 and the attendee device 430 are utilized by a presenter user and an attendee user, respectively.

In one embodiment, the presenter device 410 shares content with the attendee device 430. In one embodiment, the attendee device 430 also shares content with the presenter device 410. The conference interface 420 monitors the communications between the presenter device 410 and the attendee device 430.

Figure 5:
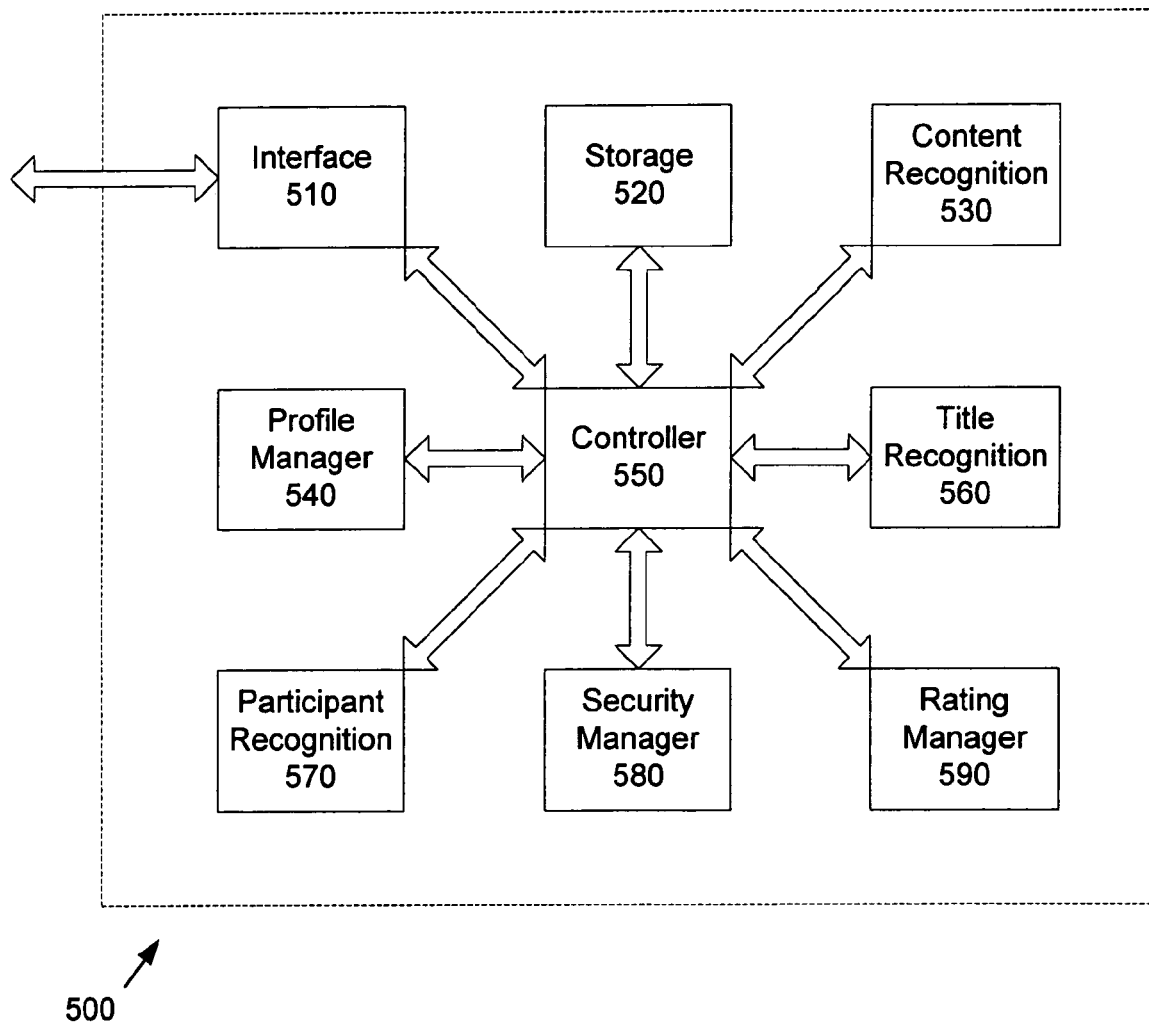
FIG. 5 is an exemplary record for use with the methods and apparatuses for extending a dynamic social network system.

FIG. 5 illustrates one embodiment of a system 500. In one embodiment, the system 500 is embodied within the server 130. In another embodiment, the system 500 is embodied within the electronic device 110. In yet another embodiment, the system 500 is embodied within both the electronic device 110 and the server 130.

In one embodiment, the system 500 includes an interface module 510, a storage module 520, a content recognition module 530, a profile manager module 540, a control module 550, a title recognition module 560, an attendee recognition module 570, a security manager module 580, and a rating manager 580.

In one embodiment, the control module 550 communicates with the interface module 510, the storage module 520, the content recognition module 530, the profile manager module 540, the title recognition module 560, the attendee recognition module 570, the security manager module 580, and the rating manager 580. In one embodiment, the control module 350 coordinates tasks, requests, and communications between the interface module 510, the storage module 520, the content recognition module 530, the profile manager module 540, the title recognition module 560, the attendee recognition module 570, the security manager module 580, and the rating manager 580.

In one embodiment, the interface module 510 receives a signal from one of the electronic devices 110. In one embodiment, the electronic devices 110 are participating in a collaboration session. For example, the system 500 monitors the collaboration session between the presenter device 410 and the attendee device 430. In another embodiment, the interface module 510 delivers a signal to one of the electronic devices 110.

In one embodiment, the interface module 510 monitors input from various interface devices connected to devices that are participating in the collaboration session. These various interface devices include a keyboard, a pointing device, a microphone, a telephone, a video camera, and the like. Further, the interface module 510 also monitors the identity of the participants of a collaboration session, the title of the collaboration session, and the content exchanged in the collaboration session.

In one embodiment, the storage module 520 stores a record including a list of attributes associated with the each device participating in a collaboration session. An exemplary list of attributes is shown in a record 600 within FIG. 6.

In another embodiment, the storage module 520 stores the collaboration session. In one embodiment, the storage module 520 stores the content that is presented during the collaboration session. In another embodiment, the storage module 520 stores the annotations and comments produced by the participants of the collaboration session.

In another embodiment, the storage module 520 stores scoring produced by the rating manager 590. In one embodiment, the scoring values for each user are stored.

In one embodiment, the content recognition module 530 detects content that is utilized by the user in connection with the device. In one embodiment, the content is utilized in connection with multiple devices within a collaboration session between multiple parties. For example, the collaboration session may include a data conference or a video conference through a network, a phone line, and/or the Internet.

In one embodiment, the content is a document utilized within a collaboration session. In another embodiment, the content is audio visual media that is utilized within a collaboration session.

In one embodiment, the content recognition module 530 detects the content exchanged between the presenter device 410 and the attendee device 430. In one embodiment, the content is textual. In another embodiment, the content is audio. In another embodiment, the content is graphical.

In one embodiment, the content recognition module 530 analyzes this content to identify key words. In one embodiment, the key words can be identified by the frequency in which the words are utilized. In another embodiment, the key words are identified by the context of the related words. For example, if the content being exchanged between the presenter device 410 and the attendee device 430 relate to computers, then the frequent use of terms such as memory, RAM, and chips may have increased significance during the collaboration session.

In one embodiment, the profile manager module 540 organizes a plurality of profiles. In one embodiment, each profile corresponds to each individual user. In another embodiment, each individual user may have multiple profiles.

In one embodiment, a profile describes attributes of the associated user. For example, the profile may include areas of interest of the associated user.

Further, the profile may also describe the areas of expertise corresponding to the associated user.

In another embodiment, the profile may also describe the relational hierarchy between multiple users. For example, the profile may also describe the title and level of the user within a company or organization.

In one embodiment, the title recognition module 560 detects the titles that describe or label collaboration sessions. In one embodiment, collaboration sessions have corresponding titles or descriptions that describe the purpose or content of the collaboration sessions. For example, a particular collaboration session may have a title "Mail Server Maintenance". The title of this particular collaboration session may be stored within a calendaring system that helps participants of this particular collaboration session keep track of their respective schedules.

In one embodiment, the participant recognition module 570 detects the identities of the participants of the collaboration session. In one embodiment, collaboration sessions have schedule participants that are scheduled to participate in a particular collaboration session. Further, there may be additional or fewer actual participants that join the particular collaboration session. In one embodiment, the participant recognition module 570 detects both scheduled and actual participants for a particular collaboration session.

In one embodiment, the participant recognition module 570 detects the identities of the participants of the collaboration session. In one embodiment, collaboration sessions have schedule participants that are scheduled to participate in a particular collaboration session. Further, there may be additional or fewer actual participants that join the particular collaboration session.

In one embodiment, the participant recognition module 570 detects distinct participants through their respective associated profiles.

In one embodiment, the security manager module 580 controls access to the profiles of each user based on the information of a requesting party. For example, if the requesting party is authorized to gain access to other profiles, the requesting party can search for profiles that match a particular criteria such as subject expertise, experience, and the like.

In one embodiment, the rating manager module 590 ranks and rates the available profiles based on a match between a request and the profile information. For example, a user may request a search for other users with an expertise in a particular area of specialty. The rating manager module 590 may review the profiles of other users and select and rank the corresponding profiles based on the whether the profiles match the area of specialty requested by the user.

In one embodiment, the system 500 suggests additional participants for a particular collaboration session based on the invited participants. In another embodiment, the system 500 suggests additional participants for a particular collaboration session based on the title or topic of the particular collaboration session.

The system 500 in FIG. 5 is shown for exemplary purposes and is merely one embodiment of the methods and apparatuses for extending a dynamic social network system. Additional modules may be added to the system 300 without departing from the scope of the methods and apparatuses for extending a dynamic social network system. Similarly, modules may be combined or deleted without departing from the scope of the methods and apparatuses for extending a dynamic social network system.

Figure 6:
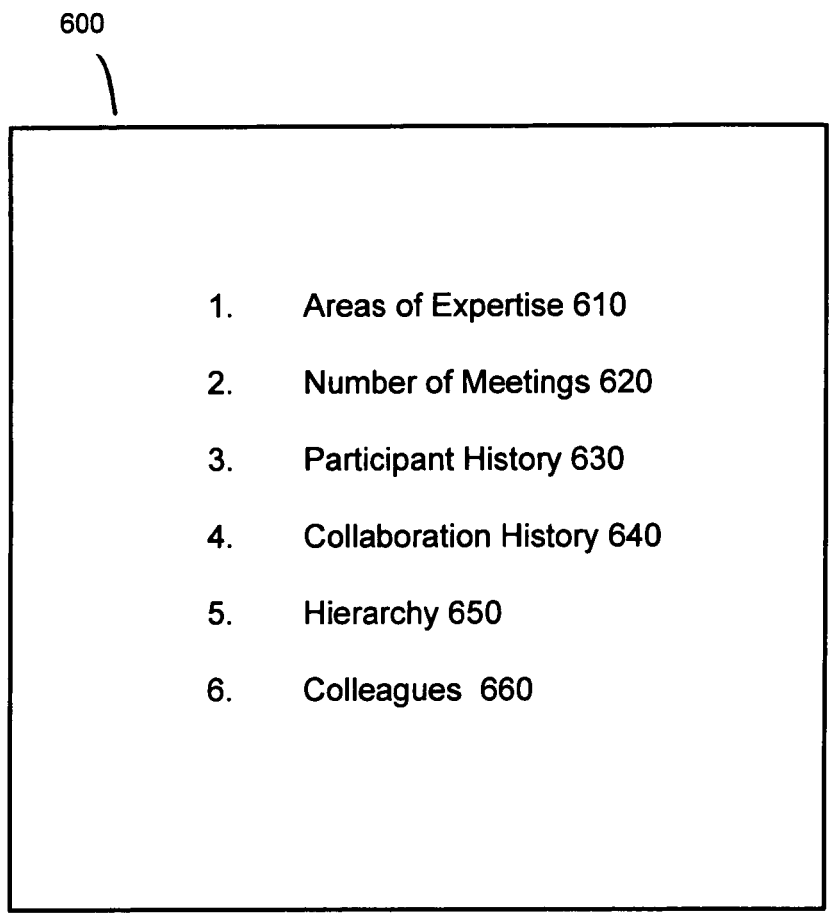
FIG. 6 is a flow diagram consistent with one embodiment of the methods and apparatuses for extending a dynamic social network system.

FIG. 6 illustrates an exemplary record 600 for use with the methods and apparatuses for extending a dynamic social network system. In one embodiment, the record 600 illustrates an exemplary record associated with a profile corresponding to a user. In one embodiment, the profile associated with the user is initiated based on the participation of the user during a collaboration session. Further, the profile associated with the user is updated and refined based on the participation of the user during a collaboration session.

In one embodiment, there are multiple records such that each record 600 is associated with a particular profile corresponding to a particular user. In another embodiment, multiple profiles are associated with the same user and each profile is represented by a record 600.

In one embodiment, the record 600 includes areas of expertise field 610, a collaboration frequency field 620, a participant history field 630, a collaboration history field 640, a hierarchy field 650, and a colleagues field 660. In one embodiment, the record 600 resides within the storage module 520. In, one embodiment, the record 600 describes an attributes detected through the system 500.

In one embodiment, the areas of expertise field 610 includes information related to the expertise of the user corresponding to the record 600. For example, the user may have designing web sites, programming databases, building houses, and the like. In one embodiment, the areas of expertise for a user are determined through the content exchanged during collaboration sessions and through titles of collaboration sessions participated in by the user.

In one embodiment, the collaboration frequency field 620 includes information related the frequency in which the user associated with the record 600 participates in a collaboration session. For example, the user may have attended a collaboration session with a frequency of four times a week. Further, the collaboration frequency field 620 may also note a percentage of whether the user was an attendee or presenter of the collaboration session. In one embodiment, the interface module 510 detects the collaboration sessions.

In one embodiment, the participant history field 630 includes the identities of the participants of collaboration sessions including the user associated with the record 600. In one embodiment, the participant recognition module 570 detects the participants of the collaboration sessions.

In one embodiment, the collaboration history field 640 includes information related the prior collaboration sessions held in which the user associated with the record 600 participated in. In one embodiment, the interface module 510 detects the collaboration sessions.

In one embodiment, the hierarchy field 650 includes information related to the profile's standing relative to other profiles. For example, the profile associated with the record 600 may be related to other profiles similar to a person being categorized within an organization chart within a company. In one instance, the profile associated with the record 600 may manage 40 other people. Accordingly, the hierarchy field 650 would reflect be associated with 40 other profiles in which the current profile would have access to the other profiles.

In one embodiment, the hierarchy field 650 allows the selected profiles to be protected from view or access from other profiles depending on the hierarchy within the field 650. For example, a profile belonging to a rank and file employee would not have access to sensitive information within a profile belonging to a manager in one embodiment.

In one embodiment, the colleague field 660 includes information related friends and colleagues of the user associated with the profile. In one embodiment, the user associated with the record 600 is able to select additional profiles associated with users to be listed within the colleague field 660.

The flow diagrams as depicted in FIGS. 7, 8, 9, 10, 11, and 12 are one embodiment of the methods and apparatuses for extending a dynamic social network system. The blocks within the flow diagrams can be performed in a different sequence without departing from the spirit of the methods and apparatuses for extending a dynamic social network system. Further, blocks can be deleted, added, or combined without departing from the spirit of the methods and apparatuses for extending a dynamic social network system.

Figure 7:
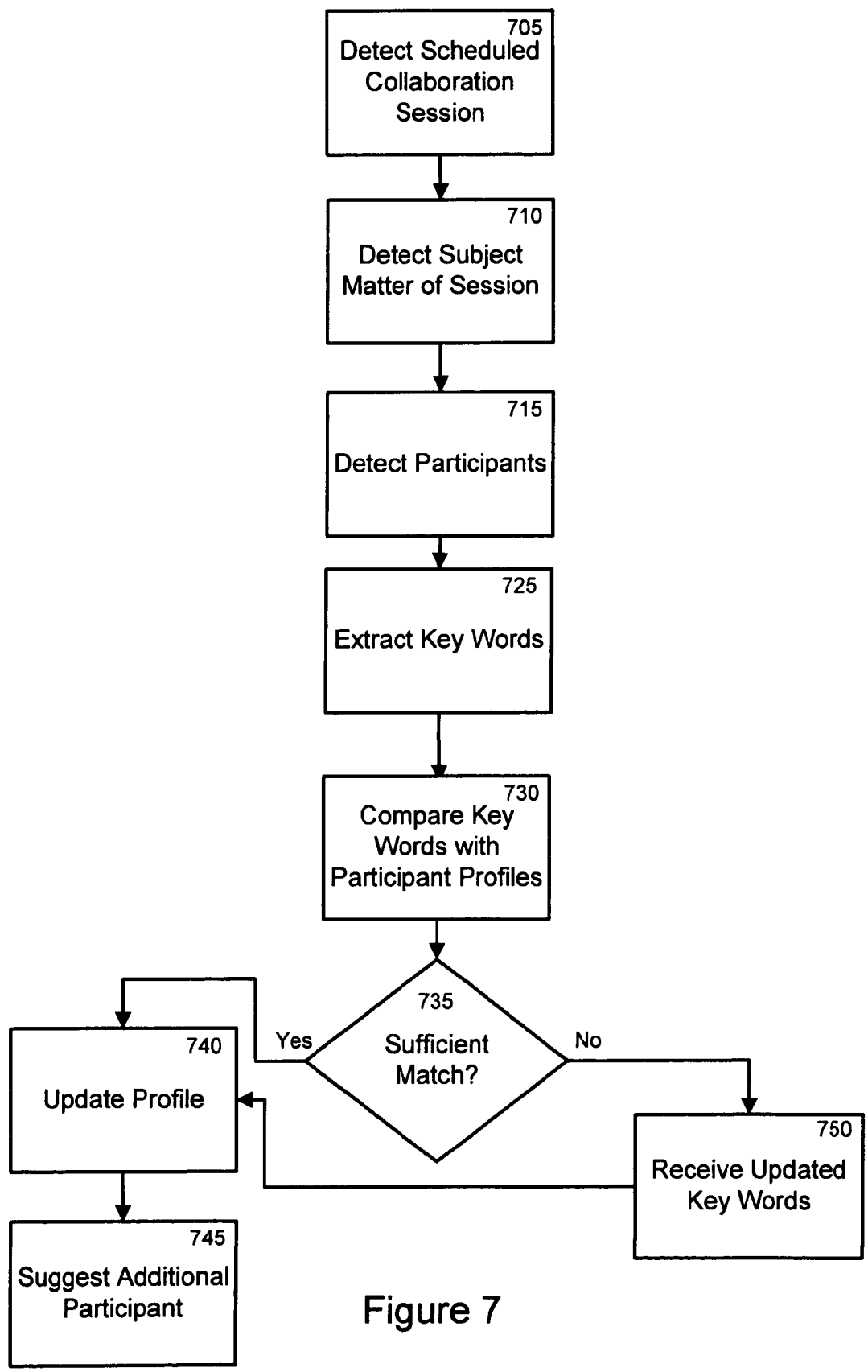
FIG. 7 is a flow diagram consistent with one embodiment of the methods and apparatuses for extending a dynamic social network system.

The flow diagram in FIG. 7 illustrates detecting activities during a collaboration session and refining the profiles of the participants of the collaboration session according to one embodiment of the invention.

In Block 705, a scheduled collaboration session is detected. In one embodiment, the scheduled collaboration session corresponds to a collaboration session that is scheduled to occur in the future. In one embodiment, the scheduled collaboration session includes identification of the subject matter of the collaboration session and the participants expected to attend.

In Block 710, the subject matter of the scheduled collaboration session is detected. In one embodiment, the subject matter includes a title given to the scheduled collaboration session. In another embodiment, the subject matter includes an agenda or description of the scheduled collaboration session.

In Block 715, the participants that are expected to attend the scheduled collaboration session are detected. For example, participants may be invited ahead of time for the scheduled collaboration session.

In Block 725, key words are extracted. In one embodiment, these key words describe the essence of the scheduled collaboration session. For example, these key words may be utilized to describe the subject matter of the scheduled collaboration session. In one embodiment, the key words are derived from the subject matter that is detected within the Block 710.

In Block 730, the key words from the Block 725 are compared with the profiles associated with the participants identified within the Block 715. In one embodiment, the profile of each participant includes an area of expertise field 610 of a record 600 that describes areas of interest and knowledge that is associated with a corresponding user of the profile. In one embodiment, the key words are compared with these areas of expertise identified within the field 610.

In Block 735, if there is a sufficient match between the profiles and the key words, then the profiles of the participants that take part in the scheduled collaboration session are updated in Block 740. In one embodiment, the areas of expertise are strengthened and updated. For example, if the participant's profile does not indicate expertise in this area, the key words are added to the participant's area of expertise field 610. Further, if the participant is already an expert in this area, then the participant's expertise if further emphasized.

In one embodiment, the number of meetings field 620 may also be increased based on the scheduled collaboration session. Further, the participant history field 630 and collaboration history field 640 can also be updated.

In one embodiment, based on the participants that are part of the scheduled collaboration session, each of the profiles may be updated to reflect other participants within the colleagues 660 field. For example, each of the participants of the scheduled collaboration session will have the other participants reflected within the colleagues 660 field based on the scheduled collaboration session.

If there is not a sufficient match within the Block 735, then key words can be manually entered or confirmed by a participant of the collaboration session in the Block 750. In one embodiment, the presenter or planner of the collaboration session confirms the key words for the corresponding collaboration session.

In one embodiment, the sufficient match is determined by the similarity between the participant profiles and the extracted key words.

In Block 745, based on the key words and the participants of the scheduled collaboration session, an additional participant may be suggested. For example, based on the key words, another profile corresponding to a potential participant may be identified through the area of expertise field 610.

In one embodiment, selected profiles that are accessible and allowed to be searched are considered. In one embodiment, the hierarchy field 650 may be utilized to determine eligibility of the profile for searching.

Figure 8:
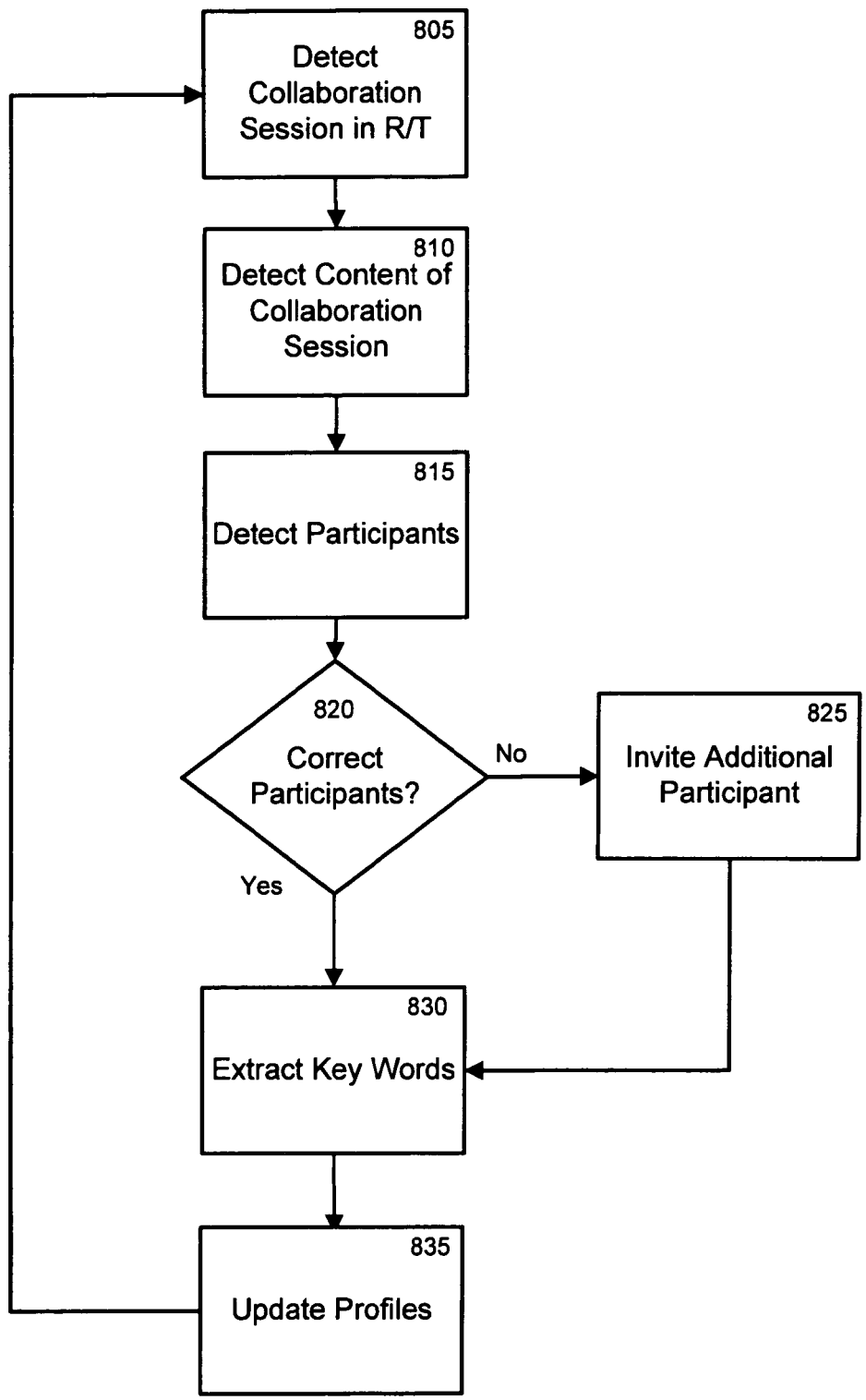
FIG. 8 is a flow diagram consistent with one embodiment of the methods and apparatuses for extending a dynamic social network system.

The flow diagram in FIG. 8 illustrates detecting activities during a collaboration session and refining the profiles of the participants of the collaboration session according to one embodiment of the invention.

In Block 805, a collaboration session is detected. In one embodiment, the collaboration session corresponds to a collaboration session that is currently taking place. In one embodiment, the collaboration session includes identification of the subject matter of the collaboration session and the participants that are attending the collaboration session.

In Block 810, the content being exchanged during the collaboration session is detected. In one embodiment, the content is the audio content exchanged during the collaboration session. In another embodiment, the content is the video content exchanged during the collaboration session. In yet another embodiment, the content is the textual or graphical content exchanged during the collaboration session.

In Block 815, the participants that are attending the collaboration session are detected. In one embodiment, different participants may attend different portions of the collaboration session. Further, the different participants are detected for the portions of the collaboration that they attend.

In Block 820, the correct participants currently attending the collaboration session is determined. For example, the listed participants for the collaboration session are checked against the current participants of the collaboration session in one embodiment.

Further, based on the profiles of the participants that are attending the collaboration and the content of the collaboration session, additional participants that were not originally contemplated may be desired. For example, if the collaboration session was originally contemplated to cover a specific technical area of expertise and the focus of the collaboration session shifts into another technical area, then other participants that have experience in this other technical area may benefit the collaboration session with their expertise.

In one embodiment, selected profiles that are accessible and allowed to be searched are considered. In one embodiment, the hierarchy field 650 may be utilized to determine eligibility of the profile for searching.

If additional participants are desired, then additional participants are invited to the collaboration session in Block 825.

In Block 830, key words are extracted. In one embodiment, these key words describe the essence of the collaboration session. For example, these key words may be utilized to describe the content of the collaboration session. In one embodiment, the key words are derived from the content that is detected within the Block 810.

In Block 835, the profiles of the participants that take part in the collaboration session are updated. In one embodiment, the areas of expertise are strengthened and updated. For example, if the participant's profile does not indicate expertise in this area, the key words are added to the participant's area of expertise field 610. Further, if the participant is already an expert in this area, then the participant's expertise if further emphasized.

In one embodiment, the number of meetings field 620 may also be increased based on participation in the collaboration session. Further, the participant history field 630 and collaboration history field 640 can also be updated.

In one embodiment, based on the participants that are part of the collaboration session, each of the profiles may be updated to reflect other participants within the colleagues 660 field. For example, each of the participants of the collaboration session will have the other participants reflected within the colleagues 660 field based on the collaboration session.

Figure 9:
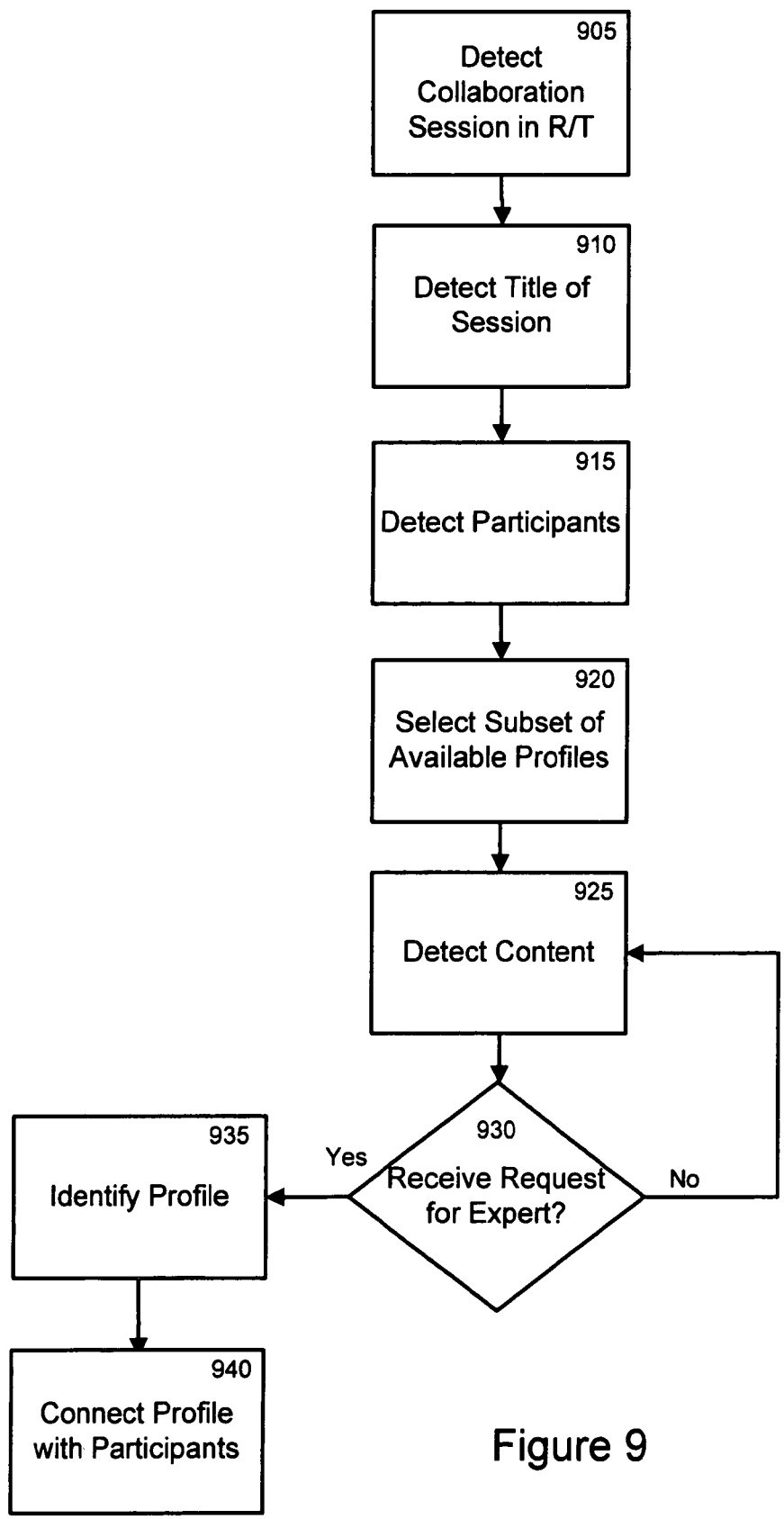
FIG. 9 is a flow diagram consistent with one embodiment of the methods and apparatuses for extending a dynamic social network system.

The flow diagram in FIG. 9 illustrates detecting activities during a collaboration session and identifying participants to join the collaboration session according to one embodiment of the invention.

In Block 905, a collaboration session is detected. In one embodiment, the collaboration session corresponds to a collaboration session that is currently taking place. In one embodiment, the collaboration session includes identification of the subject matter of the collaboration session and the participants that are attending the collaboration session.

In Block 910, the title corresponding to the collaboration session is detected.

In Block 915, the participants that are attending the collaboration session are detected. In one embodiment, different participants may attend different portions of the collaboration session. Further, the different participants are detected for the portions of the collaboration that they attend.

In Block 920, a subset of available profiles is determined based on the title of the collaboration session. For example, if the title of the collaboration session is "Caring For Your Teeth", then the subset of available profiles will include users that are related to dental care such as dentist, orthodontists, toothpaste vendors, toothbrush vendors, and the like.

In one embodiment, selected profiles that are accessible and allowed to be searched are considered. In one embodiment, the hierarchy field 650 may be utilized to determine eligibility of the profile for searching.

In Block 925, the content being exchanged during the collaboration session is detected. In one embodiment, the content is the audio content exchanged during the collaboration session. In another embodiment, the content is the video content exchanged during the collaboration session. In yet another embodiment, the content is the textual or graphical content exchanged during the collaboration session.

In Block 930, if there is a request to include an expert to participate in the collaboration session, then in Block 935 a profile is identified from the subset of available profiles that are identified within the Block 920. In one embodiment, the request to include an expert is initiated by one of the participants of the collaboration session.

In one embodiment, the profile is identified based on the content as detected in the Block 925. For example, if the content that is detected in the Block 925 is related to "Deciding on What Type of Material to Use for a Filling", then a profile that is identified as the expert would be a dentist in one embodiment.

In Block 930, if there is no request to include an expert to participate in the collaboration session, then content is detected in Block 925

In Block 940, the user associated with the identified profile in the Block 935 joins the collaboration session.

Figure 10:
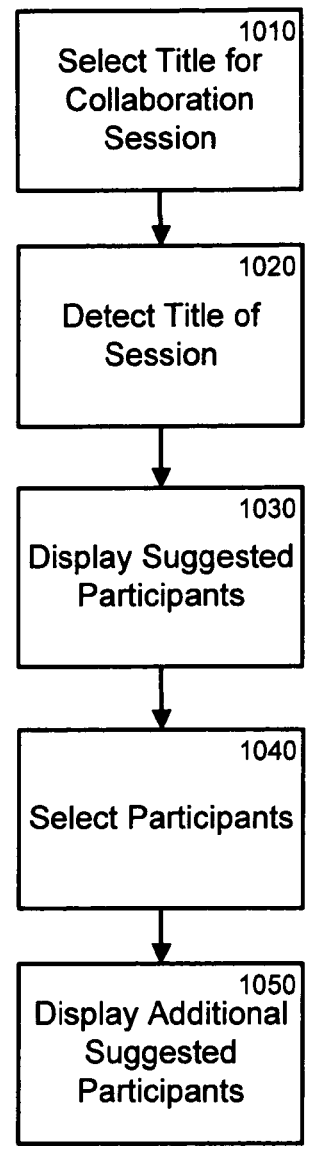
FIG. 10 is a flow diagram consistent with one embodiment of the methods and apparatuses for extending a dynamic social network system.

The flow diagram in FIG. 10 illustrates suggesting participants to join the collaboration session according to one embodiment of the invention.

In Block 1010, a title for the collaboration session is selected. In one embodiment, the collaboration session corresponds to a collaboration session that is currently taking place. In another embodiment, the collaboration session corresponds to a scheduled collaboration session that take place in the future.

In Block 1020, the title corresponding to the collaboration session is detected.

In Block 1030, suggested participants for the collaboration session are displayed. In one embodiment, the profiles are searched based on the title of the collaboration session and the participant scheduling the collaboration session.

In one embodiment, the possible profiles searched for the collaboration session is limited to profiles that are accessible by the participant scheduling the collaboration session. In one instance, the participant scheduling the collaboration session has permission to access the profiles. For example, if the participant scheduling the collaboration session has permission to access a pool of profiles, then this pool of profiles will be searched as potential participants for the collaboration session. In one embodiment, an organizational chart within a company is one example of a hierarchy that is utilized to determine whether a participant has access to other profiles. For example, subordinates on an organizational chart may not have access to superiors. On the other hand, superiors on the organizational chart have access to subordinate profiles. In another embodiment, a participant may be given proxy access rights that place the participant either further up or further down in stature on the organizational chart.

In one embodiment, the profiles are selected based on the areas of expertise of each profile relative to the subject matter of the collaboration session that is identified by the title.

In another instance, the profiles are selected based on the availability of the user associated with the profile. For example, if the status of the user is unavailable, then the particular profile will not be selected. However, if the status of the user is available as detected through the corresponding profile, then the profile is eligible for selection.

In Block 1040, the participants are selected.

In Block 1050, additional suggested participants are displayed based on the participants that were selected in the Block 1040. In one embodiment, additional participants may be selected based on the participant history field 630, the collaboration history field 640, and colleagues field 660 of the participants that are selected in the Block 1040. For example, if participant A is selected in the Block 1040 and typically participants in collaboration sessions with participant B, the participant B may be displayed as a suggested participant. Further, if the subject matter of the collaboration session as detected in the Block 1020 matches the collaboration history field 640 of participant A to suggest participant B, then the selection of participant B as a suggested participant is further strengthened.

Figure 11:
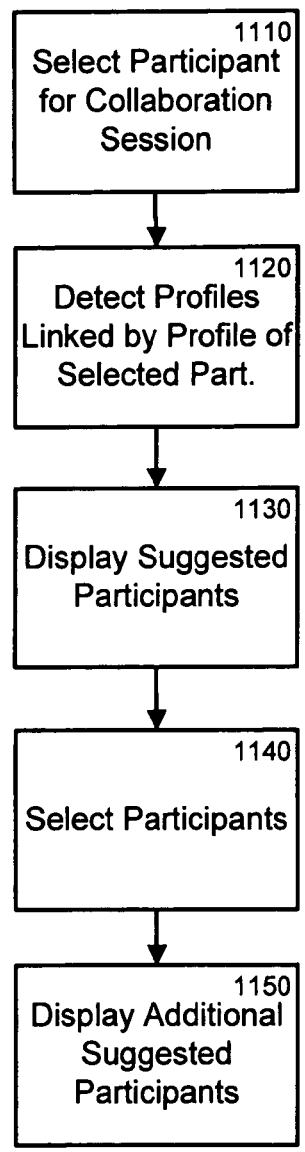
FIG. 11 is a flow diagram consistent with one embodiment of the methods and apparatuses for extending a dynamic social network system.

The flow diagram in FIG. 11 illustrates suggesting participants to join the collaboration session according to one embodiment of the invention.

In Block 1110, a participant is selected for the collaboration session. In one embodiment, the collaboration session corresponds to a collaboration session that is currently taking place. In another embodiment, the collaboration session corresponds to a scheduled collaboration session that take place in the future.

In Block 1120, the profile associated with the selected participant within the Block 1110 is detected. Further, additional profiles that are listed within the profile associated with the selected participant are also identified and suggested. In one embodiment, these additional profiles are discovered through the participant history field 630, the collaboration history field 640, the hierarchy field 650, and/or the colleagues field 660.

In Block 1130, suggested participants for the collaboration session are displayed.

In Block 1140, the participants are selected.

In Block 1150, additional suggested participants are displayed based on the participants that were selected in the Block 1140. In one embodiment, additional participants may be selected based on the participant history field 630, the collaboration history field 640, and colleagues field 660 of the participants that are selected in the Block 1140.

Figure 12:
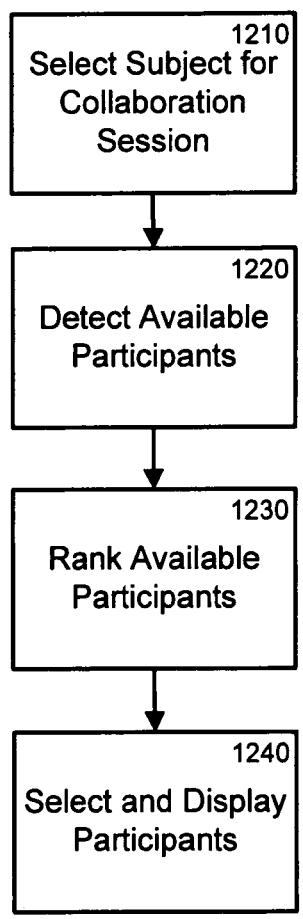
FIG. 12 is a flow diagram consistent with one embodiment of the methods and apparatuses for extending a dynamic social network system.

The flow diagram in FIG. 12 illustrates suggesting participants to join the collaboration session according to one embodiment of the invention.

In Block 1210, a subject is selected for the collaboration session. In one embodiment, the collaboration session corresponds to a collaboration session that is currently taking place. In another embodiment, the collaboration session corresponds to a scheduled collaboration session that take place in the future. In one embodiment, the subject may be reflected in the title assigned to the collaboration session. In another embodiment, the presenter of the collaboration session may explicitly state the subject of the collaboration session.

In Block 1220, available participants are detected. In one embodiment, the possible profiles searched for the collaboration session is limited to profiles that are accessible by the participant scheduling the collaboration session. In one instance, the participant scheduling the collaboration session has permission to access the profiles. For example, if the participant scheduling the collaboration session has permission to access a pool of profiles, then this pool of profiles will be searched as potential participants for the collaboration session.

In another embodiment, each of the participants associated with a corresponding profile is capable of choosing whether to allow their respective profile to be accessible to others.

In another example, the available of a profile belonging to a participant is restricted to profiles that are associated with participants affiliated with the same company.

In Block 1230, the available participants from the Block 1220 are ranked according to the subject matter of the collaboration session. For example, the available participants my have their areas of expertise field 610, number of meetings field 620, participant history field 630, and/or collaboration history field 640 examined. Based on the profile, the participant is ranked according to how closely matched the profile relates to the subject matter of the collaboration session.

In Block 1240, the highest ranked participants are selected and displayed. In one embodiment, a predetermined number of participants are selected. In another embodiment, a predetermined percentage of the total number of possible participants is selected. In yet another embodiment, a predetermined scoring threshold is applied such that participants that score above the predetermined scoring threshold are selected.

In one embodiment, the methods and apparatuses for extending a dynamic social network system allows a profile to be searched wherein the profile belongs to a user associated with a different company or a different organization within the same company. For example, the organizational structure that is searchable for a particular profile may include multiple companies that are related through partnerships, affiliations, or client and customer relationships.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    detecting, by a server, a scheduled collaboration session in a social network, the scheduled collaboration session to occur at a time in the future, and wherein a collaboration session comprises real-time audiovisual communication among participants across a network;
    detecting a first plurality of participants expected to attend the scheduled collaboration session;
    automatically determining a subject matter of the scheduled collaboration session;
    automatically determining one or more first key words from the subject matter of the scheduled collaboration session;
    updating the profiles maintained in the social network for the first plurality of participants expected to attend the scheduled collaboration session based on the one or more first key words, the updating to include refining an area of expertise indicated in the profiles of the first plurality of participants expected to attend the scheduled collaboration session to reflect the one or more first key words;
    detecting that the scheduled collaboration session is currently taking place;
    detecting a second plurality of participants currently attending the collaboration session currently taking place;
    monitoring audiovisual content being introduced by each participant in the collaboration session currently taking place across the network;
    automatically determining one or more second key words from the content being exchanged across the network; and
    repeatedly updating profiles maintained by the social network of participants attending the collaboration session currently taking place using the one or more second key words in response to changing content from each participant of the collaboration session and changing participants attending the collaboration session.

2. The method of claim 1, wherein the refining includes adding any of the one or more first key words that are not already present to the area of expertise indicated in the profiles of the first plurality of participants expected to attend the scheduled collaboration session.

3. The method of claim 1, wherein the subject matter includes a title provided for the scheduled collaboration session.

4. The method of claim 1, wherein the subject matter includes a description provided for the scheduled collaboration session.

5. The method of claim 1, wherein the content being exchanged in the collaboration session currently taking place is video.

6. The method of claim 1, wherein the further refining adds one or more second key words that are not already present to an area of expertise indicated in the profiles for the second plurality of participants attending the collaboration session.

7. The method of claim 1, wherein, prior to updating the profiles maintained in the social network, determining if a collaboration session organizer has authorization to access a pool of profiles.

8. The method of claim 1, wherein the content is audio.

9. The method of claim 1, further comprising:
    searching additional profiles maintained by the social network based on the subject matter of the scheduled collaboration session;
    based on the searching, ranking the additional profiles according to how closely the additional profiles relate to the subject matter of the scheduled collaboration session;
    selecting one or more additional participants to suggest as those having highest ranked profiles; and
    suggesting the one or more additional participants for the scheduled collaboration session.

10. The method of claim 1, further comprising:
    searching additional profiles of potential participants maintained by the social network based on the determined subject matter of the scheduled collaboration session and collaboration history of the first plurality of participants with the additional profiles; and
    based on the searching, ranking the additional profiles according to the determined subject matter of the scheduled collaboration session and collaboration history of the first plurality of participants with the additional profiles, wherein the collaboration history indicates past likelihood that a given participant of the first plurality of participants participated in collaboration sessions with a given participant of the additional profiles.

11. The method of claim 1, wherein the real-time communication includes an audio conference or a video conference.

12. An apparatus comprising:
a processor; and
a memory configured to store a first plurality of software modules executable by the processor, the software modules when executed operable to:
    detect a scheduled collaboration session in a social network, the scheduled collaboration session to occur at a time in the future, wherein a collaboration session comprises real-time audiovisual communication among participants across a network,
    detect a first plurality of participants expected to attend the scheduled collaboration session,
    automatically determine a title of the scheduled collaboration session,
    automatically determine one or more first key words from the title of the scheduled collaboration session,
    update the profiles maintained in the social network for the first plurality of participants expected to attend the scheduled collaboration session based on the one or more first key words, the updating to include refining an area of expertise indicated in the profiles of the first plurality of participants expected to attend the scheduled collaboration session to reflect the one or more first key words,
    detect that the scheduled collaboration session is currently taking place,
    detect a second plurality of participants currently attending the collaboration session currently taking place,
    monitor audiovisual content being introduced by each participant in the collaboration session currently taking place across the network,
    automatically determining one or more second key words from the content being exchanged across the network, and
    repeatedly update profiles maintained by the social network of participants attending the collaboration session currently taking place using the one or more second key words in response to changing content from each participant of the collaboration session and changing participants attending the collaboration session.

13. The apparatus of claim 12, wherein the content being exchanged in the collaboration session currently taking place is video.

14. The apparatus of claim 12, wherein the software modules when executed are further operable to:
    search additional profiles maintained by the social network based on the subject matter of the scheduled collaboration session,
    based on the searching, rank the additional profiles according to how closely the additional profiles relate to the subject matter of the scheduled collaboration session,
    select one or more additional participants to suggest as those having highest ranked profiles, and
    suggest the one or more additional participants for the scheduled collaboration session.

15. The apparatus of claim 14, wherein the software modules when executed are further operable to:
    search additional profiles of potential participants maintained by the social network based on the determined subject matter of the scheduled collaboration session and collaboration history of the first plurality of participants with the additional profiles; and
    based on the search, rank the additional profiles according to the determined subject matter of the scheduled collaboration session and collaboration history of the first plurality of participants with the additional profiles,
    wherein the collaboration history indicates past likelihood that a given participant of the first plurality of participants participated in collaboration sessions with a given participant of the additional profiles.

16. Software encoded on one or more non-transitory computer readable medium and when executed operable to:
    detect a scheduled collaboration session in a social network, the scheduled collaboration session to occur at a time in the future, wherein a collaboration session comprises real-time audiovisual communication among participants across a network;
    detecting a first plurality of participants expected to attend the scheduled collaboration session;
    automatically determine a subject matter for the collaboration session provided when scheduling the collaboration session;
    automatically determine one or more first key words from the subject matter for the collaboration session provided when scheduling the collaboration session;
    update the profiles maintained in the social network for the first plurality of participants expected to attend the scheduled collaboration session based on the one or more first key words, the updating to include refining an area of expertise indicated in the profiles of the first plurality of participants expected to attend the scheduled collaboration session to reflect the one or more first key words;
    detect that the scheduled collaboration session is currently taking place;
    detect a second plurality of participants currently attending the collaboration session currently taking place;
    monitor audiovisual content being introduced by each participant in the collaboration session while the collaboration session is taking place across the network;
    automatically determine one or more second key words from the content being exchanged in the collaboration session across the network; and
    repeatedly update profiles maintained by the social network of participants attending the collaboration session currently taking place using the one or more key words in response to changing content from each participant of the collaboration session and changing participants attending the collaboration session.

17. The software of claim 16, wherein the update adds any of the one or more first key words, or the one or more second key words, that are not already present to the area of expertise indicated in the profiles of the first plurality of participants.

18. The software of claim 16, wherein the subject matter for the collaboration session provided when scheduling the collaboration session includes a title provided for the collaboration session.

19. The software of claim 16, wherein the software when executed is further operable to:
    search additional profiles maintained by the social network based on the subject matter of the scheduled collaboration session; and
    based on the searching, rank the additional profiles according to how closely the additional profiles relate to the subject matter of the scheduled collaboration session;
    select one or more additional participants to suggest as those having highest ranked profiles; and
    suggest the one or more additional participants for the scheduled collaboration session.

20. The software of claim 16, wherein the software when executed is further operable to:
    search additional profiles of potential participants maintained by the social network based on the determined subject matter of the scheduled collaboration session and collaboration history of the first plurality of participants with the additional profiles; and based on the searching, rank the additional profiles according to the determined subject matter of the scheduled collaboration session and collaboration history of the first plurality of participants with the additional profiles, wherein the collaboration history indicates past likelihood that a given participant of the first plurality of participants participated in collaboration sessions with a given participant of the additional profiles.

* * * * *